O. A. WENBERG.
TANK HEATER.
APPLICATION FILED APR. 6, 1917.
1,351,194.
Patented Aug. 31, 1920.
3 SHEETS—SHEET 1.
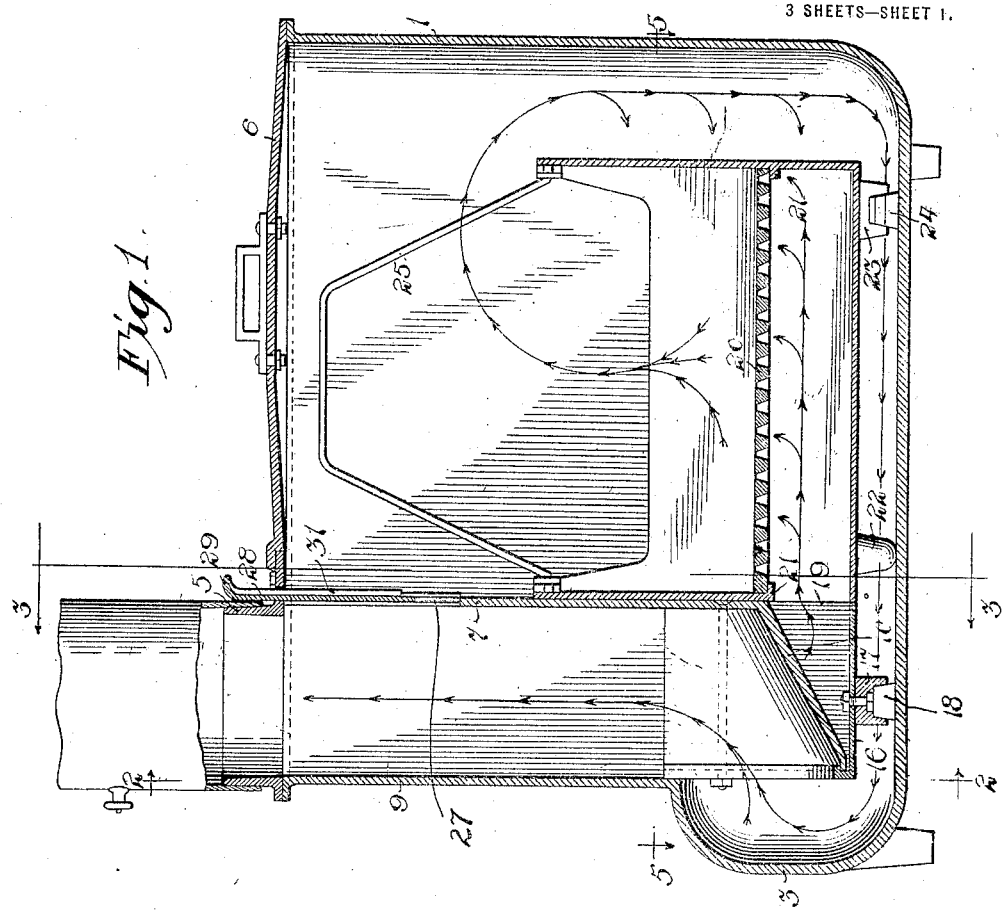

O. A. WENBERG.
TANK HEATER.
APPLICATION FILED APR. 6, 1917.
1,351,194.
Patented Aug. 31, 1920.
3 SHEETS—SHEET 2.
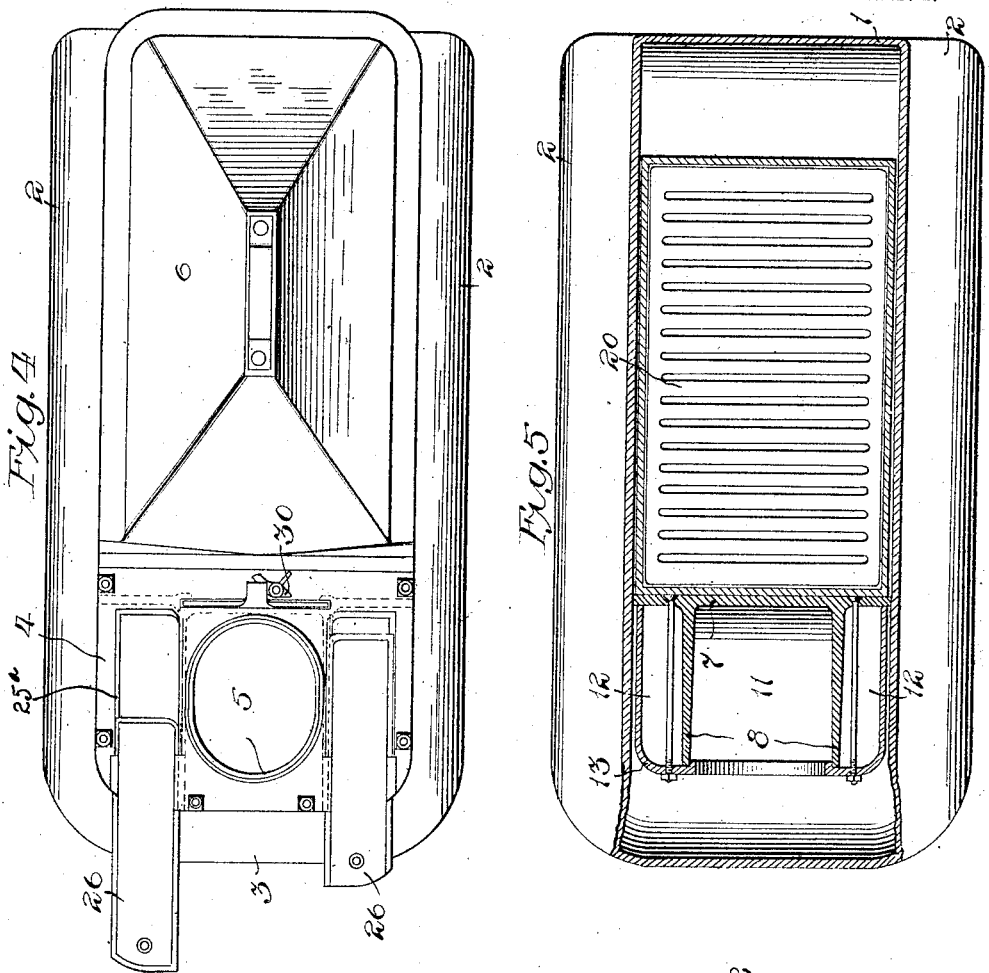
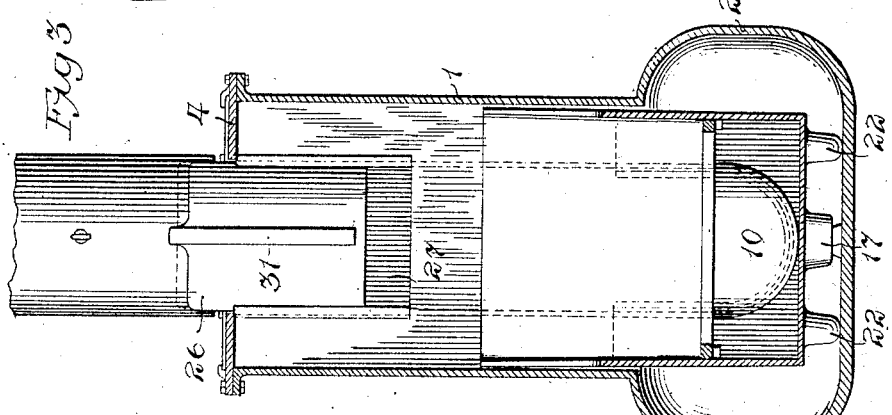
Inventor
Oscar A. Wenberg O. A. WENBERG.
TANK HEATER.
APPLICATION FILED APR. 6, 1917.
1,351,194.
Patented Aug. 31, 1920.
3 SHEETS—SHEET 3.
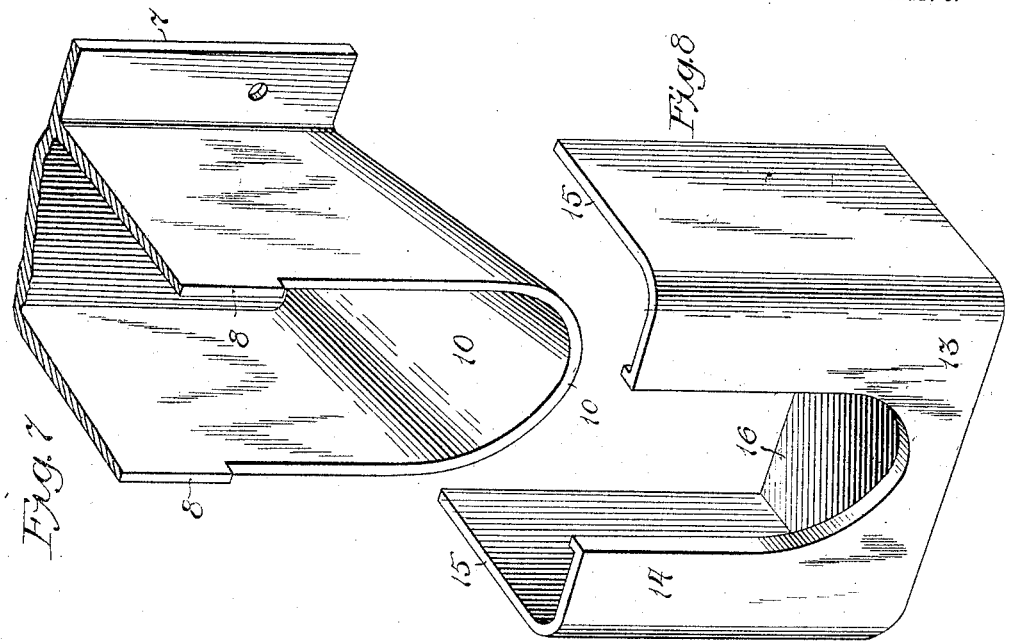
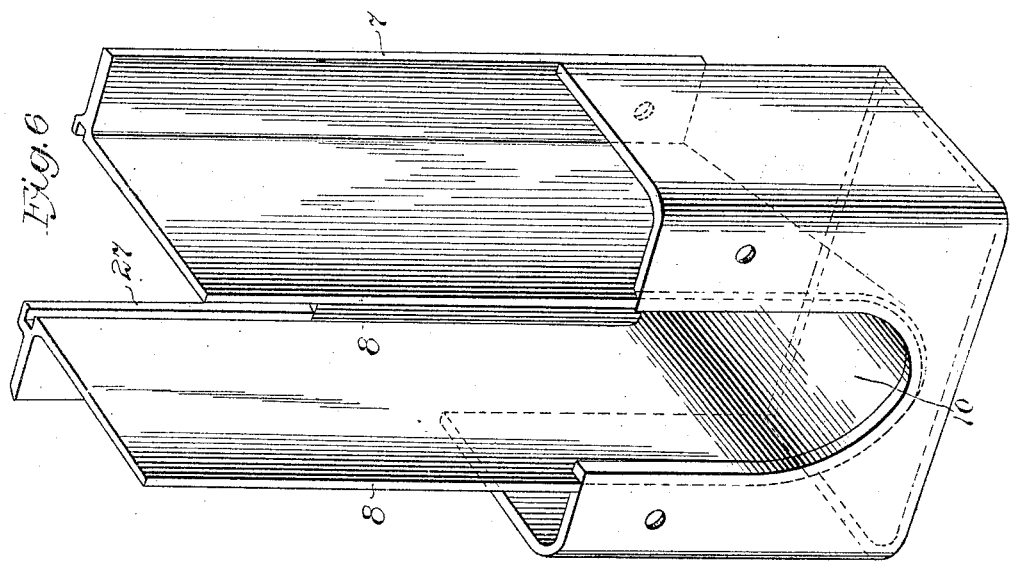
Inventor
Oscar A. Wenberg

UNITED STATES PATENT OFFICE.

OSCAR A. WENBERG, OF BATAVIA, ILLINOIS, ASSIGNOR TO UNITED STATES WIND ENGINE & PUMP COMPANY, OF BATAVIA, ILLINOIS, A CORPORATION OF ILLINOIS.

TANK-HEATER.

1,351,194.  Specification of Letters Patent.  Patented Aug. 31, 1920.

Application filed April 6, 1917. Serial No. 160,154.

*To all whom it may concern:*

Be it known that I, OSCAR A. WENBERG, a citizen of the United States, residing at Batavia, in the county of Kane and State of Illinois, have invented new and useful Improvements in Tank-Heaters, of which the following is a full, clear, concise, and exact description, reference being had to the accompanying drawing, forming a part of this specification.

My invention relates to improvements in tank heaters, and particularly that type of heater which is adapted to be bodily set down in the water of a cattle drinking-trough, or the like, for the purpose of heating the water.

One of the objects of my invention is to provide a heater wherein the heated air will be caused to take a circuitous path along the sides and bottom of the heater before passing out through the chimney.

Another object of my invention is to provide a heater wherein the fire may be quickly started.

Other objects of my invention will appear from the accompanying specification.

For the purpose of disclosing my invention, I have illustrated in the accompanying drawings one embodiment thereof. In said drawings—

Figure 1 is a longitudinal sectional view of the invention;

Fig. 2 is a transverse sectional view taken on the line 2—2 of Fig. 1;

Fig. 3 is a transverse sectional view taken on the line 3—3 of Fig. 1;

Fig. 4 is a top plan view of the heater;

Fig. 5 is a horizontal sectional view taken on the line 5—5 of Fig. 1; and

Figs. 6, 7 and 8 are detail views of the division casting forming the smoke and draft flues.

In the embodiment illustrated, the heater body 1 is preferably substantially rectangular in shape and at its bottom has its sides enlarged or bulged out, as at 2, and one end likewise enlarged or bulged out, as at 3. This body is provided at one end with a top 4 having an upwardly extending, substantially oval or round flange 5, over which a suitable chimney pipe may be secured. The remaining portion of the body is covered by a removable cover plate 6. One end of the body is divided into a smoke and a draft flue by means of a transversely extending dividing plate 7, which extends from side to side and almost to the bottom of the container body, the point of stopping of the dividing plate being substantially in line with the fire grate. Forwardly extending from the dividing plate 7 are a pair of webs 8. which extend forward to the front side 9 of the body portion. These webs at their lower end merge into a rounded, forwardly extending plate 10, which slopes downwardly from the bottom of the division plate 7. There is thus formed by this division plate 7 and the web 8 a smoke flue 11, on either side of which are formed the draft flues 12. It will be noted that at their lower ends the draft flues open, due to the bulged forward end of the body member, into the body member. In order to close this opening, I provide a closure or cover member 13, which comprises a face portion 14 fitting over the lower end of the webs 8 and the side plates 15, which extend rearwardly to and at their upper portion meet the division member 7, and a bottom portion 16. The front plate 14 is cut out to form a U-shaped opening, as illustrated, which leaves the smoke chimney open at its front end. A suitable spacing and positioning lug 17 is secured on the bottom of this cover member 13 for positioning the same within the body portion. This lug is recessed on its under side and fits over a lug 18 cast in the bottom of the body member. The fire pot, as shown, takes a position immediately behind the division member 7 and comprises a rectangular container having an opening 19 at its forward end and being provided with a suitable grate 20 supported on flanges 21 in the pot and suitably raised from the bottom of the pot. The forward end of the fire pot is provided with suitable legs 22 and the rear end with a spacing leg 23 recessed on its under side and adapted to fit over an upwardly extending lug 24 on the bottom of the container. A suitable bail 25 is provided for placing the fire pot in and removing it from position in the heater.

In the top 4 there are provided suitable openings 25$^a$ communicating with the draft flues 12, the size of which is controlled by suitable sliding cover members 26.

It is thus seen that there is provided in this structure a pair of draft passages which lead downwardly from the top and which convey the air, as shown in the dotted lines, particularly in Figs. 1 and 2, under the chimney, back through the front opening 19 in the fire pot, up through the grate, from whence it passes out at the top of the grate, and then downwardly underneath the fire pot, and the draft ducts, forward to the bulged portion 3 of the casing, thence up into the smoke chimney, and out by the chimney opening. Due to this circuitous passage of the heated air as it passes from the fire pot it is retained longer in the heater and tends to heat the water at the bottom of the tank to a greater degree.

After the fire has been well started the draft passage above described is sufficient to keep the fire going, but in order that a quick starting of the fire may be obtained and in order to get a direct draft through the fire pot and into the chimney, I provide at 27 an opening in the division member 7, which is controlled by a sliding damper 28. The top hooked portion 29 by which the damper is raised or lowered projects above the top of the casing and a suitable latch 30 engaging under the end of the rib 31 on the damper is provided for holding the damper in its raised or open position. With the damper open, it will be noticed that the draft, instead of passing out of the fire pot and thence down under the fire pot and up through the chimney, will pass directly out of the top of the fire pot into the chimney, thus giving a direct and what may be termed a forced draft, for the purpose of starting the fire quickly. After the fire has been well started the damper 28 is closed and the draft is then caused to take the circuitous passage above described, so that the smoke and heat will pass down under the bottom of the fire pot and thence up through the chimney.

In practice, the heater body is formed of cast iron in order that it may have sufficient weight to hold it submerged in the water of the tank and to give it strength to withstand the pressure of the water when so submerged. At the same time, by forming the body of cast iron it is given sufficient strength to withstand the general rough treatment such a structure receives, without having its sides dented and without being twisted and distorted.

By making the heater body of the shape illustrated, it is made long enough for ordinary sized fuel wood, and the preparing of special sized fuel is rendered unnecessary. As the tank is submerged in water the displacement must be kept down and in order to get sufficient size and weight I bulge the bottom as shown so that sufficient weight is given at this part to keep the tank submerged, and at the same time the displacement is kept down while giving sufficient size to the fire box, which is located above the bulge, to accommodate the fuel and provide for the bodily lifting out of the fire box.

Having thus described my invention, what I claim as new and desire to secure by Letters Patent, is:—

1. A tank heater comprising an elongated rectangular body having vertically extending smoke and draft flues at one end extending to the bottom of the body, said draft flues having a rearwardly extending opening and said smoke flue having a forwardly extending opening, and a fire-pot comprising a receptacle having a grate spaced apart from the bottom thereof and provided with an opening in its side wall directly communicating with the draft flues, and horizontally disposed smoke flues formed in the body at the bottom thereof and disposed on either side of the fire-pot and extending from the rear of the body forwardly and communicating with the smoke flue.

2. A tank heater comprising an elongated rectangular body having its sides and one end enlarged below the center of gravity and having division walls in its front to form vertically extending smoke and draft flues, the draft flues opening rearwardly at the bottom of the body and the smoke flue opening forwardly, and a rectangular fire-pot of substantially the same width as the upper part of the body fitting therein and extending into the enlarged part thereof and provided with a grate spaced apart from the bottom of the body, said body having an opening in its front wall below the grate directly communicating with the draft flues.

3. A tank heater comprising an elongated body having the bottom wider than the top and having vertically extending draft and smoke flues arranged side by side at one end of the body and extending into the enlarged portion thereof, and a fire-pot mounted behind the flues of the same width as the upper portion of the body and extending down into the enlarged portion thereof, and having a grate separated from the bottom of the fire-pot, said fire-pot communicating beneath the grate directly with the draft flues and the smoke flues opening into the bottom of the body.

4. A tank heater comprising an elongated body having the bottom wider than the top and having smoke and draft flues therein extending from the top into the widened body portion, the smoke flue communicating with the bottom portion of the body, and a removable fire-pot of substantially the same width as the upper part of the body and extending down into the widened portion of the body, said fire-pot having a grate therein spaced apart from its bottom, and said fire-pot communicating directly with the draft flues below the grate and a damper in the smoke flue above the fire-pot.

5. In a tank heater, the combination with a body portion having the lower portion of its sides and one end enlarged to form smoke and heat chambers in the bottom of the body portion, a dividing member extending between the contracted side walls of the heater body and having forwardly extending webs engaging one of the end walls of the body to form a chimney flue and draft flues, the lower ends of said forwardly extending webs being connected together to close the chimney flue against the draft flues, means for closing the draft flues against communication with the end bulge while leaving the chimney flue open thereto, a fire pot arranged within said body and having an opening beneath the grate communicating with the bottoms of the draft flues, and a chamber formed in said chimney flue whereby a direct draft may be created through the fire pot and into the chimney flue.

6. A tank heater comprising an outside casing to be immersed in the water, a fire-box in said casing having a grate for the fire to rest on, means for supplying air underneath said grate to support combustion, a compartment underneath said grate into which the ashes fall, and a passage for conducting substantially all the burned gases underneath said ash receptacle and along the sides thereof, said passage being located adjacent the outer casing walls, whereby a large heating surface is provided.

7. A tank heater comprising an outer casing to be immersed in the water, a fire-box in said casing having a grate, an ash receptacle underneath said grate, means for supplying air to said fire-box to support combustion, and a passage for conducting substantially all the hot burned gases underneath said ash receptacle and along the sides thereof and along the sides of the fire-box, said passage being located adjacent the walls of said outer casing, whereby a large heating surface is provided.

8. A tank heater comprising an outer casing to be immersed in the water, said casing having an enlarged chamber at the bottom, and a reduced chamber extending upwardly from said enlarged chamber, the side walls of said enlarged chamber extending substantially beyond the side walls of said reduced chamber, a fire-box insertible into said casing through said reduced chamber, a passage for the burned gases, comprising channels in the laterally-extending portions of said reduced chamber, said passage being so constructed that substantially all of the hot burned gases have to pass from one end to the other of said fire-box in order to escape.

9. A tank heater comprising an outer casing to be immersed in the water, said casing having an enlarged chamber at the bottom, and a reduced chamber extending upwardly from said enlarged chamber, the side walls of said enlarged chamber extending substantially beyond the side walls of said reduced chamber, a fire-box insertible into said casing through said reduced chamber, a passage for the burned gases, comprising channels in the laterally-extending portions of said reduced chamber, said passage being so constructed that substantially all of the hot burned gases have to pass alongside of and underneath of said fire-box in order to escape.

10. A tank heater comprising an outer casing to be immersed in the water, said casing having an enlarged chamber at its bottom and a reduced chamber above said enlarged chamber, said enlarged chamber having its sides bulging out to extend beyond said side walls of said reduced chamber, a fire-box insertible into said casing through said reduced chamber, and means whereby substantially all of the burned gases have to pass from one end to the other of said fire-box, said means including passages in said bulging portions.

11. A tank heater comprising an outer casing to be immersed in the water, said casing having an enlarged chamber at its bottom and a reduced chamber above said enlarged chamber, said enlarged chamber having its sides bulging out to extend beyond the side walls of said reduced chamber, a fire-box insertible into said casing through said reduced chamber, and means whereby substantially all of the burned gases have to pass from one end to the other of said fire-box, said means including passages in said bulging portion extending alongside said fire-box.

12. A tank heater comprising an outer casing to be immersed in the water, said casing having an enlarged chamber at its bottom and a reduced chamber above said enlarged chamber, said enlarged chamber having its sides bulging out to extend beyond the side walls of said reduced chamber, a fire-box insertible into said casing through said reduced chamber, and means whereby substantially all of the burned gases have to pass from one end to the other of said fire-box, said means including passages in said bulging portion extending alongside said fire-box, and a passage extending underneath said fire box.

13. A tank heater comprising a casing to be immersed in the water, said casing having an enlarged lower chamber and a reduced upper chamber, leading to said lower chamber, said lower chamber having its sides and one end bulged out to extend beyond the walls of said upper casing, a fire-box insertible into said casing through said reduced chamber, and means whereby substantially all of the hot burned gases have to pass from one end to the other of the fire-box, said means comprising passages in said bulging portions, whereby a large heating surface is provided.

In witness whereof, I have hereunto subscribed my name.

OSCAR A. WENBERG.